(12) United States Patent
Nguyen

(10) Patent No.: US 9,514,435 B2
(45) Date of Patent: Dec. 6, 2016

(54) SYSTEM FOR TARGETING SPECIFIC USERS TO DISCUSSION THREADS

(75) Inventor: David T. Nguyen, San Jose, CA (US)

(73) Assignee: Accenture Global Services Limited, Dublin (IE)

( * ) Notice: Subject to any disclaimer, the term of this patent is extended or adjusted under 35 U.S.C. 154(b) by 340 days.

(21) Appl. No.: 12/542,486

(22) Filed: Aug. 17, 2009

(65) Prior Publication Data
US 2011/0041082 A1 Feb. 17, 2011

(51) Int. Cl.
*G06F 3/048* (2013.01)
*G06Q 10/10* (2012.01)

(52) U.S. Cl.
CPC ..................... *G06Q 10/10* (2013.01)

(58) Field of Classification Search
USPC .................................. 715/733, 752
See application file for complete search history.

(56) References Cited

U.S. PATENT DOCUMENTS

| | | | |
|---|---|---|---|
| 5,875,302 A * | 2/1999 | Obhan | 709/225 |
| 5,905,991 A | 5/1999 | Reynolds | |
| 5,987,480 A | 11/1999 | Donohue et al. | |
| 6,020,884 A | 2/2000 | MacNaughton et al. | |
| 6,055,510 A | 4/2000 | Henrick et al. | |
| 6,321,242 B1 | 11/2001 | Fogg et al. | |
| 6,352,479 B1 | 3/2002 | Sparks, II | |
| 6,449,765 B1 | 9/2002 | Ballard | |
| 6,571,234 B1 * | 5/2003 | Knight | G06Q 10/10 |
| 6,772,139 B1 | 8/2004 | Smith, III | |
| 7,159,011 B1 * | 1/2007 | Knight | G06F 17/30864 707/999.003 |
| 7,203,704 B1 * | 4/2007 | Stern et al. | 707/627 |
| 7,747,705 B1 * | 6/2010 | Raja | 709/219 |
| 7,899,869 B1 * | 3/2011 | Anderson | G06Q 10/10 709/206 |
| 7,904,500 B1 * | 3/2011 | Anderson | 709/200 |
| 2002/0046099 A1 | 4/2002 | Frengut et al. | |
| 2002/0078095 A1 | 6/2002 | Culham | |
| 2002/0111843 A1 * | 8/2002 | Wellenstein | 705/8 |
| 2005/0027707 A1 * | 2/2005 | Syed | 707/9 |
| 2005/0138121 A1 | 6/2005 | Banatwala et al. | |

(Continued)

FOREIGN PATENT DOCUMENTS

| | | |
|---|---|---|
| CN | 101008918 A | 8/2007 |
| JP | 2002259285 A | 9/2002 |

(Continued)

OTHER PUBLICATIONS

Yukawa, et al., Performance Evaluation of an Information Filtering Function for the Intelligent Bulletin Board System, IPSJ SIG Technology Reports, Apr. 25, 2007, 9 pages (English Abstract).

(Continued)

*Primary Examiner* — Ajay Bhatia
*Assistant Examiner* — Haimei Jiang
(74) *Attorney, Agent, or Firm* — Fish & Richardson P.C.

(57) ABSTRACT

The present invention is directed to provide a method and system for targeting individuals and providing a reference to a discussion in a discussion forum. A method is described herein that allows a user of an integrated discussion forum interface to initiate the generation of a direct, navigable reference to a thread or message in the discussion forum to one or more targeted individuals. By generating a direct, navigable reference to the thread or message, the system may advantageously facilitate the directed solicitation of targeted individuals while leveraging the accessibility, reusability, and available knowledge base of a traditional public forum.

37 Claims, 6 Drawing Sheets

(56) References Cited

U.S. PATENT DOCUMENTS

| | | | |
|---|---|---|---|
| 2005/0209904 A1* | 9/2005 | Hayashi | 705/9 |
| 2006/0026593 A1* | 2/2006 | Canning et al. | 718/100 |
| 2006/0085245 A1* | 4/2006 | Takatsuka et al. | 705/9 |
| 2006/0111894 A1* | 5/2006 | Sammarco et al. | 704/9 |
| 2007/0067271 A1 | 3/2007 | Lu | |
| 2007/0067405 A1 | 3/2007 | Eliovson | |
| 2007/0208802 A1 | 9/2007 | Barman et al. | |
| 2007/0276676 A1 | 11/2007 | Hoenig et al. | |
| 2007/0288563 A1 | 12/2007 | Karkanias | |
| 2008/0040427 A1* | 2/2008 | Shroff et al. | 709/204 |
| 2008/0082607 A1* | 4/2008 | Sastry | G06Q 10/107 709/204 |
| 2008/0109491 A1* | 5/2008 | Gupta | G06Q 10/10 |
| 2008/0147487 A1* | 6/2008 | Hirshberg | G06Q 30/02 705/14.53 |
| 2008/0147810 A1* | 6/2008 | Kumar et al. | 709/206 |
| 2008/0222531 A1* | 9/2008 | Davidson et al. | 715/736 |
| 2008/0243729 A1 | 10/2008 | Icenoggle | |
| 2008/0307320 A1 | 12/2008 | Payne et al. | |
| 2009/0070426 A1* | 3/2009 | McCauley et al. | 709/205 |
| 2009/0077124 A1* | 3/2009 | Spivack et al. | 707/103 Y |
| 2009/0204681 A1* | 8/2009 | Sun | 709/206 |
| 2009/0240516 A1* | 9/2009 | Palestrant | 705/1 |
| 2009/0282100 A1* | 11/2009 | Kim et al. | 709/203 |
| 2009/0287682 A1* | 11/2009 | Fujioka | G06F 17/30867 |
| 2010/0070554 A1* | 3/2010 | Richardson et al. | 709/202 |
| 2010/0161631 A1* | 6/2010 | Yu et al. | 707/758 |
| 2010/0169888 A1* | 7/2010 | Hare et al. | 718/102 |
| 2010/0174724 A1* | 7/2010 | Wallace | G06F 17/30589 707/749 |
| 2010/0229127 A1* | 9/2010 | Williams | 715/854 |
| 2010/0281399 A1* | 11/2010 | Banker | 715/758 |
| 2010/0299326 A1* | 11/2010 | Germaise | 707/728 |
| 2011/0040843 A1* | 2/2011 | Kussmaul et al. | 709/206 |
| 2011/0153761 A1 | 6/2011 | Anderson | |
| 2011/0161130 A1* | 6/2011 | Whalin et al. | 705/7.18 |

FOREIGN PATENT DOCUMENTS

| | | |
|---|---|---|
| JP | 2002342232 A | 11/2002 |
| JP | 2003030100 A | 1/2003 |
| JP | 2005085017 A | 3/2005 |
| JP | 2005266938 A | 9/2005 |
| JP | 2007328471 A | 12/2007 |
| JP | 2009169914 A | 7/2009 |
| WO | 2006020758 A2 | 2/2006 |
| WO | 2006118558 A1 | 11/2006 |

OTHER PUBLICATIONS

First Office Action issued in Chinese Application No. 201010256214.7 on Feb. 17, 2014; 10 pages.

* cited by examiner

SYSTEM FOR TARGETING SPECIFIC USERS TO DISCUSSION THREADS

BACKGROUND

The development and proliferation of information networks and technologies have revolutionized traditional methods of asynchronous interpersonal communication of information. Asynchronous communication is described as the exchange of messages or data between two or more parties over a displacement of time. Typically, asynchronous communication is performed via the publishing (e.g., delivery) and subsequent viewing of some parcel containing the message between two or more communication participants.

Since asynchronous communication generally includes the exchange of information over some tangible medium or via an object, the medium or object may have a persistent quality. Accordingly, these objects may be preserved and stored, and the message or data comprising the asynchronous communication may be retained, archived, and referenced one or more times after reception. In contrast, traditional synchronous communication methods include the interchange of speech or information in real time (e.g., a conversation), wherein retrospective reference is generally not possible and/or easily available due to typical, self-limiting design constraints of conventional synchronous communication interfaces.

Traditional methods of asynchronous communication still in use today include mail delivery (or "post") and bulletin boards—a shared resource wherein one or more messages may be posted and displayed. Typically, these messages are used to advertise goods or services, and provide announcements. Traditionally, bulletin boards are often made of a material such as cork to facilitate the addition, removal and replacement of messages.

Popular digital communication techniques such as electronic mail (e-mail) and digital message boards (also known as "discussion forums") have been developed to support asynchronous communication that provide numerous benefits—such as near-instantaneous delivery and worldwide accessibility—over their traditional, physical counterparts. Both forms of digital asynchronous communication techniques extend the ability to support remote, distanced communication, as well as co-located communication. Unfortunately, the same two major classes of asynchronous communication—that is, e-mail and discussion forums—each provide distinct advantages whilst simultaneously suffering from varied and significant flaws.

For example, with respect to discussion forums, an individual may publish or "post" a (generally) untargeted message (e.g., posing a question, for example) on a topical discussion forum and wait for other users of the forum to view the question and to post an informative response. Alternatively, typical discussion forums also provide the ability to review and reuse previous questions and answers by allowing a user to run a search in past forum entries of relevant keywords or terms related to the individual's question.

In theory, public discussion forums are based on the underlying model of a large, global network and rely on the principle that given enough viewers of a forum message, a portion of those viewers will post a response. Unfortunately, this reliance on user-generated content can have unpredictable results. For example, the efficacy of discussion forums for obtaining relevant information can be highly variable and inconsistent between one discussion forum and the next. The quality and timeliness of the responses may fluctuate drastically, depending on the popularity and demographic of the forum, and the interest of the core viewing audience in the particular subject matter or message topic.

Moreover, typical public discussion forums have limited or nonexistent moderation and filtering of irrelevant responses. As a result, unqualified and/or malicious individuals may also post responses which may subject the original message poster to unwanted derision, embarrassment and dangerous advice with little to no repercussion. In many instances, a user in the discussion forum will not be familiar or personally acquainted with the large majority of the discussion forum constituents and, as a result, may be disinclined to exert a significant amount of resources or effort to provide assistance.

Moreover, with no knowledge of the respondent's qualifications, a forum participant may lack confidence in the veracity of the information received. Furthermore, the untargeted nature and anonymity of discussion forums supply little or no impetus for the viewing constituency to participate in a discussion or assist a posting user. As a result, urgent messages that seek immediate attention may not be addressed in a timely manner. Naturally, all of these circumstances, alone or in combination can adversely affect the user's experience.

The other widely used tool for digital interpersonal asynchronous communication is the usage of electronic mail, wherein a question or message through some interface may be delivered to identified individuals or organizations. The same individual or organization members may use a compatible interface to view and respond to the message. Since the recipients of the message are specifically targeted, the identification of the individual within the context of the electronic mail system must be provided with particularity. Naturally, specific identification typically corresponds with a greater level of familiarity, thus the disadvantages incumbent to a public un-targeted discussion forum of anonymous users can be mitigated to some degree.

The advantage of e-mail is that specifically targeted messages increase the chance of a timely response. With respect to answering a question, the recipient of the e-mail message may respond likewise with either the answer, or forward the message (or provide a reference) to someone else who knows the answer. Unfortunately, that same requirement of identifying with particularity the recipients of an e-mail naturally limits the viewing audience. As a result, the available pool of knowledge is commensurately much smaller.

Moreover, e-mail by nature is not publicly accessible and thus does not provide the ability for reuse. Consequently, questions which have been answered by others in the past may not be referenced, and the efficiency of that capability is lost. Furthermore, each individual or a list of individuals must be selected by the message's originator. The message's originator must consider the qualifications of the recipient(s) and estimate the recipient(s) availability and responsiveness on a generally individual basis. In addition, this factor also inherently imposes an effective ceiling on the aggregate pool of expertise that is limited to the individuals the message's originator knows. Obviously, the pool of expertise may be drastically different for each message originator, thus the efficacy of e-mail as a resource may fluctuate dramatically between users. Moreover, a greater number of recipients typically correlates to an increase in the time required to address and include each recipient, thereby reducing the efficiency of the process.

SUMMARY OF THE INVENTION

Embodiments of the present invention are directed to provide a method and integrated system for targeting individuals and providing a reference to a discussion in a discussion forum. A method is described herein that allows a user of a discussion forum to initiate the generation of a direct, navigable reference to a thread or message in the discussion forum to one or more targeted individuals, within a single integrated system. By generating a direct, navigable reference to the thread or message, the system may advantageously facilitate the directed solicitation of targeted individuals whilst operating within the traditional framework of a public forum.

One novel system includes a discussion forum interface capable of receiving user-input to generate a target sub-interface. User supplied data is received by the target sub-interface and a notification including a direct reference is generated and delivered electronically to the identified targets. Another novel system provides the functionality of an individual targeting discussion forum within the relatively capable and flexible infrastructure of a social networking application. This system combines the advanced features of a social networking application, such as identifying a sub-network for individuals and a persistent user accounting visible to other users to inspire user contributions, identify qualified references and facilitate automatic notifications.

Each of the above described novel systems and method feature the ability to provide a directed solicitation of targeted individuals whilst retaining the accessibility, reusability, and broader knowledge base of a public forum. In short, a user's interactions and queries can be more consistently and conveniently accessed and addressed by both familiar, targeted individuals as well as helpful public contributors.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
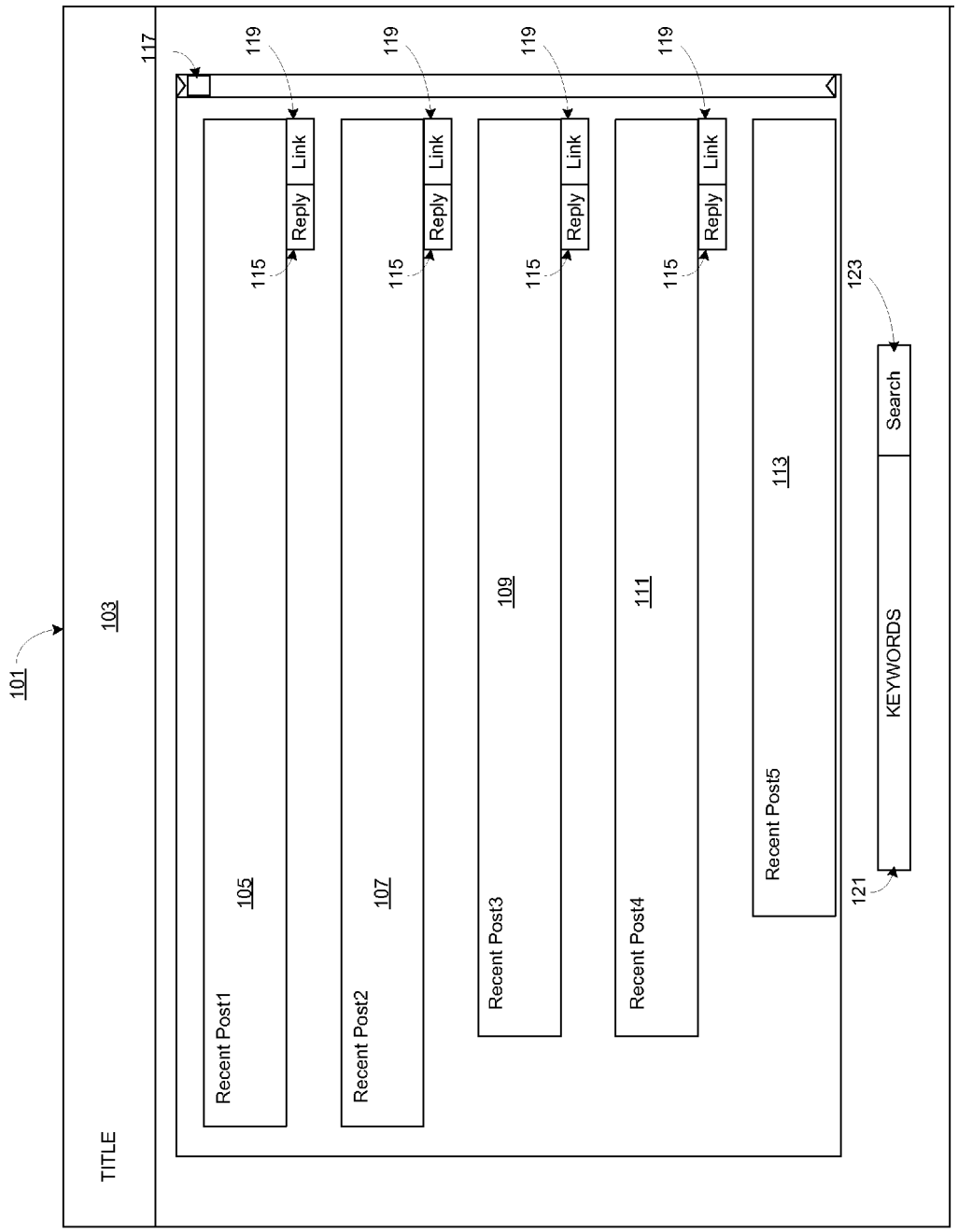
FIG. 1 is a depiction of an exemplary discussion thread in a discussion forum, in accordance with embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Discussion Forum with Targeted Referrals

According to embodiments of the claimed subject matter, a system including one or more discussion forums displayed in one or more interfaces is provided. A user of the system may thus elect one of the discussion forums to view and/or contribute to. In a typical embodiment, a discussion forum interface may present one or more discussion topics. In further embodiments, each discussion topic is arranged in a "thread" of linked and related user-generated messages relevant to the particular discussion topic. In some embodiments, an individual thread may be presented in a separate graphical user interface (e.g., a discussion thread interface) accessible from the discussion forum interface. In one embodiment, the discussion forum may comprise a portal webpage of a website, wherein each thread is presented on a separate webpage of the website and accessible from the portal webpage via corresponding hypertext links.

FIG. 1 depicts a graphical depiction of an exemplary discussion thread 100 in accordance with various embodiments of the present invention. In a typical configuration, discussion thread 100 may comprise an interface 101 displaying the topic of the thread (typically as a title of the interface, e.g., title panel 103), all or a portion of the linked and related user-generated messages comprising the discussion thread (e.g., recent post panel 105, 107, 109, 111, and 113) and a sub-interface or specific user-input terminal (not shown) capable of receiving new user-input to append to the thread. In some embodiments, the sub-interface for receiving new user-input to append to the thread is not immediately displayed, but may be generated by the system via actuation on specifically identified portions of the user interface 100 (e.g., "reply" button 115).

In further embodiments, the user-generated messages comprising the thread may be presented to represent the relationship of the messages. For example, messages which are a direct response to messages other than the original message may be visibly distinguished from messages responsive to the original message. In one embodiment, the messages are visibly distinguished using indentation (e.g., message 109 and 111 are responsive to message 107, message 113 is responsive to message 111). Accordingly, the discussion thread interface 101 may present a cascaded arrangement of the user-generated messages to connote the relationships amongst the messages. In further embodiments, a view of the user-generated messages in the thread may be re-arranged in the display to present a chronological view of the messages, wherein the messages are displayed in ascending (or, variably, descending) order according to chronology.

In still further embodiments, the discussion thread interface 101 may also include a scroll bar 117 for vertically navigating through the material in a single page that exceeds the formatted viewing space. In still further embodiments, a discussion thread 100 may have content distributed across multiple web pages, wherein the web pages may be collectively navigated through means provided in the thread interface 100. In some embodiments, the means may comprise, for example, arrows or buttons on the interface 100 that, upon user actuation, may enable a user to navigate the web pages via actuation on the arrows or buttons.

In some embodiments, users of the discussion thread interface 101 may search for specific content within a particular thread and/or search the discussion forum interface for a particular thread itself. Searching for specific content within a particular thread may be performed via designated searching mechanisms. As presented, designated searching mechanisms may comprise a graphical search input field 121 and a search initiation button 123. A user is able to search for specific content by submitting keywords corresponding to the desired content within the graphical search input field 121 and actuating on the search initiation button. In one embodiment, content corresponding to the searched-for keywords is presented to the user. The content may be presented by, for example, visually distinguishing the keywords when the keywords are detected (e.g., via colored highlighting). In other embodiments, the content may be presented as a list of messages containing the searched-for keywords in some order (e.g., chronologically). The list of messages may be displayed within the thread interface 101 itself, or within a dynamically generated window or interface.

Searching for particular threads or threads according to particular keywords may be performed through similar search mechanisms (e.g., also through a graphical search input field 121 and search initiation button 123). In some embodiments, the search mechanisms for searching for threads may be presented in the discussion forum interface. In one embodiment, searching for keywords amongst threads may return a list of threads with subject titles corresponding to the keywords. In further embodiments, the list of threads may also contain threads with content corresponding to the keywords, albeit without necessarily corresponding titles. Threads corresponding to the searched-for keywords may be presented as a list of navigable thread links, wherein actuation of the thread link will bring the viewer to the thread interface 101 of the particular thread. In still further embodiments, the threads corresponding to the searched-for keywords may also include, for example, a list of contributing experts, posted links and submitted files for each thread in the list of threads (described with greater detail below). In some embodiments, threads (and their constituent information) may be preserved as an archive, thereby enabling retrospective reference to subsequent related queries.

In a conventional discussion thread however, directly targeting specific viewers or contributors and requesting a response is not available beyond including an identification of the intended viewer and/or contributed in the title of the thread, or, alternatively, composing a message in the thread which includes an identification of the individual of interest. Unfortunately, unless the individual of interest is actively monitoring the thread interface, the individual may not have notice of a specifically directed conversation. Alternatively, a user may use a dedicated e-mail application and send a web address and/or hyperlink to a targeted individual that directly refers to the web page of the thread. However, this necessitates the addition of an unrelated application and may refer the targeted user only to the webpage, but not the specific message. In implementations where a single webpage can contain a large amount of messages, reading through each message to ascertain the specific message in question can be a time consuming and inefficient process.

Accordingly, the claimed subject matter is directed to a method and system for referring targeted individuals to a discussion forum. In one embodiment, the discussion thread interface 100 is provided with the ability to generate, intrinsically, a sub-interface capable of receiving user-input which identifies, with particularity, one or more target individuals to a discussion forum. In one embodiment, the ability to generate the sub-interface comprises a button (e.g., button 119) on the thread interface 100, which, when actuated, creates a user input terminal for receiving user-input specifically formatted as individual addresses in a system. In some embodiments, the individual addresses may comprise e-mail addresses. In other embodiments, the individual addresses may comprise identified user accounts in an enterprise system.

In one embodiment a hyperlink to the website of the discussion thread interface 100 is provided to the individual addresses. In further embodiments, the link may direct the addressee to a specific message in the thread. Accordingly, by providing the ability to target specific individuals to a discussion forum in a single, integrated application, a user of the system can advantageously request contributions from specific individuals whilst simultaneously benefiting from the potentially limitless knowledge base due to a larger network of potential contributors.

Social Network Application

In a typical social network application implemented as an online application, members of a social network may create user accounts which represent the user through interactions with other users in the social network. In conventional social network applications, each user account has a separate display which may be viewed by some or all of the other users in the social network through the social network application. In some embodiments, the displays corresponding to the user accounts comprise one or more linked web pages. In further embodiments, the web pages corresponding to a user account may contain user-supplied and/or user-configurable content which presents to viewers information about the member, such as interests, contact information, personal history, etc.

Figure 2:
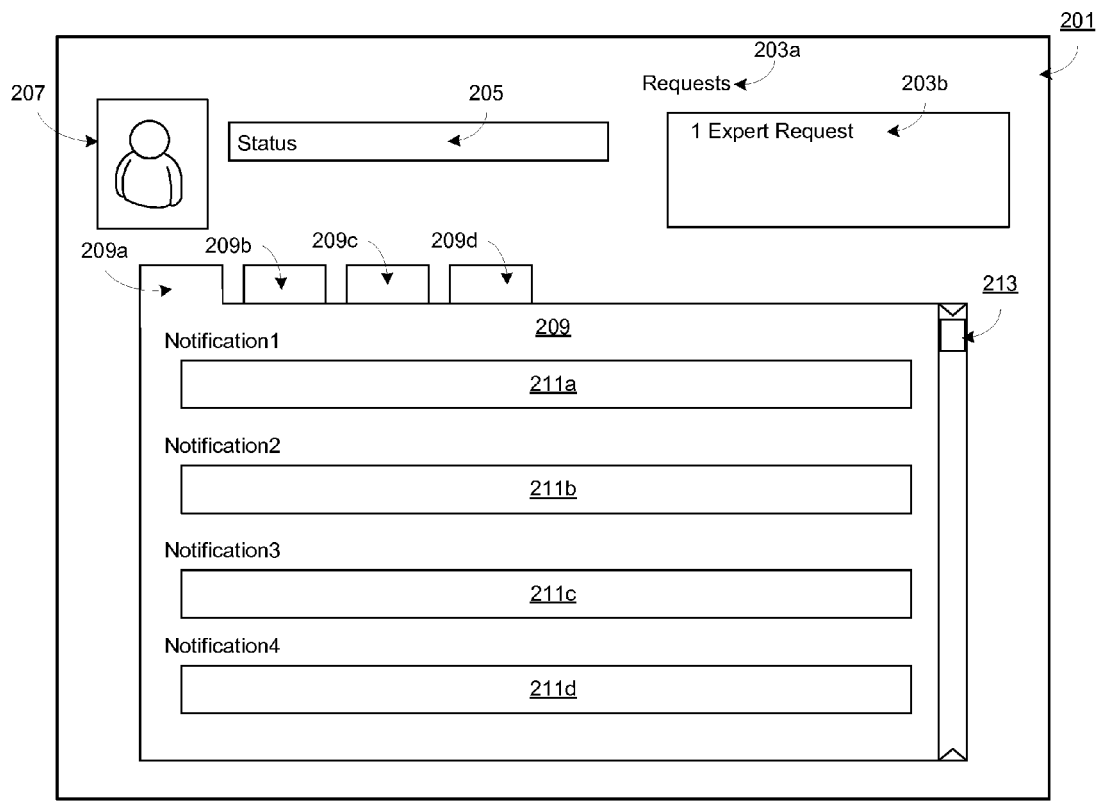
FIG. 2 is an exemplary graphical user interface of a user profile in a social networking system, in accordance with embodiments of the present invention.

In typical social network applications, each user is capable of defining one or more sub-networks of specifically identified other users to comprise a user's private network. In further implementations, assimilation in a user's private network necessitates the acquiescence of the other user. According to some embodiments, the functionality of a discussion forum capable of referring targeted individuals to specific material in a discussion thread is integrated into a social networking application. With reference now to FIG. 2, an exemplary graphical user interface of a user profile 200 in a social networking system is depicted, in accordance with embodiments of the present invention.

In a typical configuration, user profile 200 may be implemented as an interface comprising a profile panel 201 corresponding to a user account in a social network application. In one embodiment, the user account is associated with a specific member of a social network. In some embodiments, the account may be created and/or managed exclusively by said member of the social network. In other embodiments, the account may be created and managed by an administrator. In one embodiment, user profile 200 is the display generated by the system to represent the user account. Typical features presented in profile panel 201 may include, for example, a photo 207 of the member corresponding to the account (in some embodiments, configurable by the user), a greeting or status message, e.g., status panel 205, also configurable via input from the member.

In further embodiments, user profile 200 may include a panel displays requests of the member from other members of the social network. The panel may be displayed with a title (e.g., Requests Panel Header 203a) and a display area (e.g., Requests Display Area 203b). In one embodiment, specific requests may be displayed in the order the requests were made to the user (e.g., chronologically). Alternatively, the requests may be displayed according to some pre-defined arrangement depending on the type of request. In one embodiment, user profile 200 also includes a main display panel 209.

Main display panel 209 may thus contain and display material relevant to the user account and distributed across one or more navigable tabs (e.g., tabs 209a, 209b, 209c, 209d). For example, material corresponding to intra-network correspondence from other user accounts, the user's displayed personal info, the user's identified sub-network of other users and the user's photographs may each be separately delineated and alternatively displayed in main display panel 209. User actuation on identified buttons (e.g., the navigable tabs 209a, 209b, 209c and 209d) may allow a user to traverse and view the desired material.

As presented, tab 209a corresponds to inter-network correspondence (e.g., non-private messages), public announcements, and other similar activities performed by the user through the user account and/or through interactions with other user accounts in the social network. In one embodiment, these activities are displayed as notifications (e.g., Notification1 211a, Notification2 211b, Notification3 211c, and Notification4 211d). In one embodiment, the notifications may be presented in reverse chronological order (e.g., the most recent notification is displayed first, then each successively less recent notification is displayed next).

In further embodiments, a scroll bar 213 is provided to navigate the material displayed in the main display panel 209, in the event the contents displayed in the main display panel 209 exceeds the boundaries of the panel 209. As depicted, the scroll bar 213 may be implemented as a vertical scroll bar which is configured to vertically navigate the material comprising a source of content by altering the portions of the content displayed. In alternate embodiments, the scroll bar 213 may be implemented as a horizontal scroll bar configured to navigate the material along the horizontal axis. In still further embodiments, both a vertical scroll bar and a horizontal scroll bar may be provided.

Figure 3:
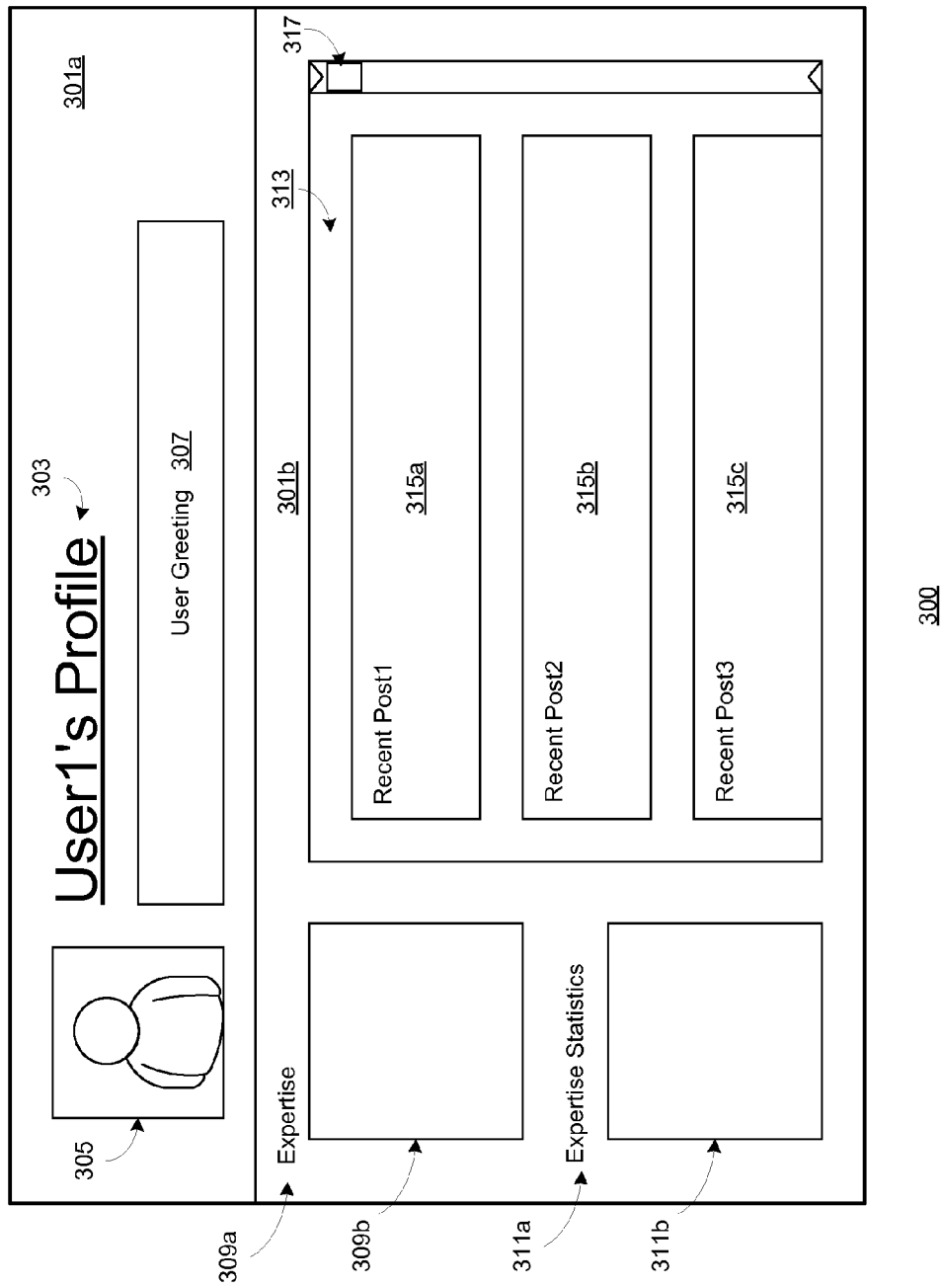
FIG. 3 is an exemplary graphical user interface of a user profile viewed by another user in a social networking system, in accordance with embodiments of the present invention.

With reference now to FIG. 3, an exemplary graphical user interface of a user profile 300 as viewed by other users in a social networking system is depicted, in accordance with embodiments of the present invention. In a typical configuration, user profile 300 may be implemented as a graphical interface comprising a user profile corresponding to a user account in a social network application. In one embodiment, the user account is associated with a specific member of a social network and the user profile is the representation of the user displayed to other users. As depicted, the user profile 300 includes a user introduction portion (e.g., Introduction panel 301a) and a user content portion (e.g., content panel 301b).

Typical features presented in introduction panel 301a may include, for example, a designation of the name or title of the account (e.g., Account Banner 303), a visual representation of the user (e.g., icon 305) and a panel displaying user-generated content as a greeting or status (e.g., greeting panel 307). In one embodiment, the visual representation of the user comprises an image file supplied by the user. In other embodiments, the visual representation may be an icon from a pre-defined bank of icons provided by the system that is selected by the user (either previously or dynamically). According to some embodiments, the greeting panel 307 may display a short message from the user visible to other user accounts when viewing the user profile 300.

According to some embodiments, user profile 300 also includes a user content portion, e.g., content panel 301b. In a typical configuration, content panel 301b may be user-configured to present additional information regarding the social network member represented by the user profile 300. Content panel 301b may also include, for example, a snap-shot of the user's recent activity or information regarding the background of the member (e.g., personal, professional, academic, or contact information) and/or interests. As depicted, content panel 301b includes a user activity panel 313 and user information panels (e.g., panels 309b, and 311b)

In one embodiment, user activity panel 313 presents a display chronicling the recent activity performed on, through, or by the user account. For example, a typical social networking application may also facilitate the communication of non-private directed interactions (e.g., messages) exchanged between user accounts. In one embodiment, these interactions between the user account and other users in the social network application may be displayed in the user activity panel 313. In further embodiments, the interactions may be presented in reverse chronological order. In still further embodiments, other user-performed activity in the social network, such as posted announcements and notifications may be displayed in the user activity panel 313.

As depicted, the content panel 313 also includes user information panels 309b and 311b. In one embodiment, user information panels 309b, 311b may be user-configured to display information, such as contact information, professional information, etc. User information panels 309b, 311b may also be configured to display the user's interests, usage statistics, and/or affiliations. In one embodiment, a social networking application with one or more integrated discussion forums may monitor, track and/or classify the subject and content of a discussion thread. Thus, discussion topics may be classified according to the subject matter and associated with one or more predefined classes.

These classes may be comprised of, for example, disciplines, areas of study, or other topics of interest with various levels of specificity. In further embodiments, individual messages in a discussion thread may automatically be classified to the same class as the topic of the thread. In some embodiments, classification of messages and/or threads may be internally performed and stored in the system.

In still further embodiments, user accounts may be affiliated in the system with one or more of these classes. This affiliation may be displayed to other users in the user's profile (e.g., user profile 300), for example. Affiliation may denote a user's interest, competency and/or expertise in the class. In one embodiment, affiliation may be acquired by user election. In further embodiments, affiliation may be established via peer nomination and/or approval or based on a user's contribution within the social network community. For example, according to some embodiments, viewers of a discussion thread may be allowed to provide feedback (directly through the interface, for example) on the subjective quality of the thread. In further embodiments, viewers may be allowed to provide feedback on the quality of individual messages.

Thus, a user's contributions (e.g., posted messages) to a discussion forum may be tracked and monitored by accumulating the feedback received on the user's contributions from other community members. In embodiments that classify the discussion threads and/or posted messages according to disciplines, areas of study and/or topics of interest, the user's contribution may be similarly tagged and classified. This information may be subsequently displayed along with a display of the user's corresponding affiliations.

User information panels 309b and 311b of FIG. 3 depict such an example. In a typical configuration, user information panels 309b and 311b include a corresponding title panel (e.g., banner 309a and 311a). A title panel (e.g., banner 309a) may indicate the title or subject of the data represented in the corresponding user information panel (e.g., user information panel 309b). As depicted, a user's recognized and/or established affiliations may be displayed in information panel 309b, entitled "Expertise" and the user's contributions within the community, according to feedback from other community members may be represented in information panel 311b, entitled "Expertise Statistics."

The user's contributions may be represented according to various metrics, and/or further delineated according to the particular class or affiliation. Sample metrics may include, but are not limited to, a user's ratio of positively received contributions to negatively received contributions, a user's ratio of positively and/or negatively received contributions to total contributions, the total number of community contributions made by the user in the user's history, the total number of user contributions distinguished for each area of expertise, etc. According to other embodiments, user information panels 309b, 311b may also be configured to display additional information.

By displaying a user's contributing statistics, a user identified as being affiliated with one or more classes may be motivated to contribute more frequently. By further providing a means through which a user's contributions may be subject to peer review, frivolous and/or malicious responses may be prevented or mitigated. Accordingly, these effects combine advantageously to provide discussion forum with an improved user experience.

Discussion Thread Interface

Figure 4:
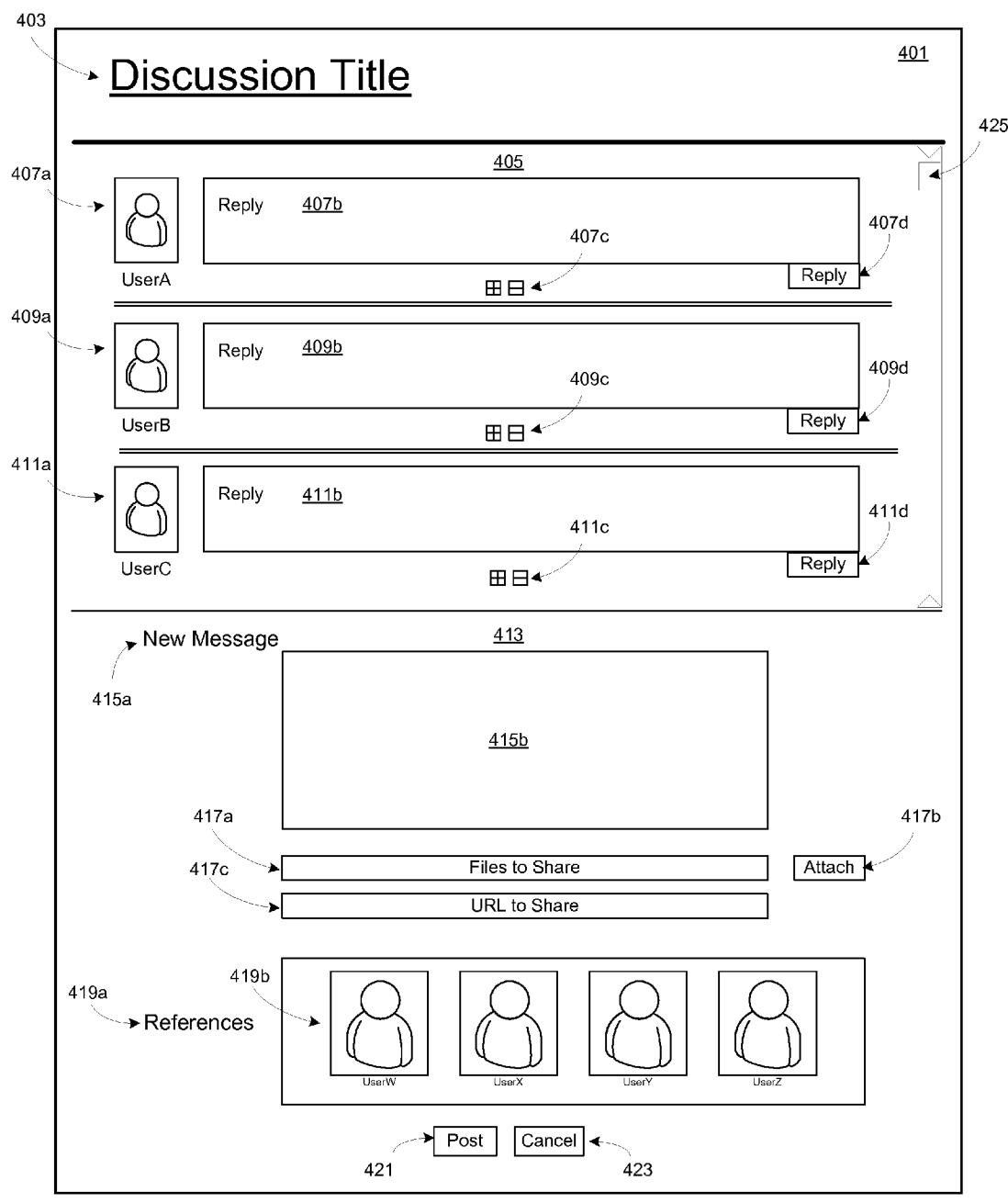
FIG. 4 is a depiction of an exemplary graphical discussion thread interface of a discussion forum, in accordance with embodiments of the present invention.

According to embodiments of the claimed subject matter, a distributed, graphical social network application may incorporate one or more discussion forums comprising multiple discussion threads in one or more interfaces. A user of the system may thus elect a thread of a discussion forum to view and/or contribute to. FIG. 4 is a graphical depiction of an exemplary discussion thread interface 400 of a discussion forum in a social network, in accordance with embodiments of the present invention. Discussion thread interface 400 may, for example, comprise the graphical user interface wherein the discussion thread 100 described above with reference to FIG. 1 is displayed to the user.

In a typical configuration, discussion thread interface 400 may comprise multiple portions, including, for example, an introduction panel (e.g., introduction 401), a message display (e.g., message display sub-interface 405) and an input terminal (e.g., message input sub-interface 413). In one embodiment, introduction 401 may comprise a title banner (e.g., banner 403) displaying the title or subject matter of the thread. According to further embodiments, the originating user may also submit a title to the thread during the creation process. In these and similar embodiments, the title of the thread may be displayed in banner 403. Other content displayed in introduction 401 may include, for example, a status indication (e.g., if the thread is active, de-active, or locked), a list of thread moderators, the list of identified subjects or classes associated with the thread, etc.

Message display sub-interface 405 displays the collection of messages (e.g., messages 407b, 409b, and 411b) comprising the thread. The messages may be displayed in chronological order, or, alternatively in reverse chronological order. In other embodiments, the messages may be displayed in a cascaded arrangement such that the relationships between the messages are displayed with distinction (see above with respect to FIG. 1). In a typical configuration, the user may elect to vary the display according to these arrangements via a mechanism for configuring the display, such as a button on the interface.

For popular threads, a single display may be insufficient to clearly display each message independently. Accordingly, mechanisms to facilitate the display of messages of a thread in a display may be provided. As shown, Message display sub-interface 405 includes a scroll bar 425. In one embodiment, the scroll bar 425 enables a user to alter the presently viewed portion of a single contiguous piece of content, as described above with reference to scroll bar 213 of FIG. 2. In further embodiments, mechanisms to facilitate the display of messages of a thread in a display may be implemented as one or more thread navigation buttons. According to these implementations, the thread navigation buttons may be configured to receive user input consistent with an actuation that traverses the messages of the thread as a collection of displays, each display comprising one or more messages.

In one embodiment, the messages may also be presented with a visual representation (e.g., icons 407a, 409a, and 411a) of the author of the message (e.g., 407b, 409b and 411b are presented with corresponding visual representations 407a, 409a, and 411a). In one embodiment, the visual representation comprises a photograph of the user. The visual representation may present, for example, a miniaturized version of the visual representation displayed on the user's profile. In other embodiments, the visual representation may comprise an image or icon pre-selected by the user from an established base of icons.

According to some embodiments, a user of the thread interface 401 may be able to individually respond to a message in a thread. In further embodiments, each display of a message in a thread interface 400 is presented with a reply mechanism (e.g., reply mechanisms 407d, 409d, and 411d). As depicted, the reply mechanism may be implemented as a button configured to detect a user actuation. Once a user actuation is detected, a window or sub-interface may be generated to receive and submit the user's reply. In some embodiments, each message may be individually replied to. A reply message may be subsequently displayed in the message display sub-interface 405, as arranged according to the user's specifications. For example, a user may opt to display the messages to display relativity, wherein, messages which are related (e.g., source messages and corresponding reply messages) may be grouped together. Alternatively, messages may be displayed chronologically, wherein a reply message may have some other visual reference to the source message (e.g., a quote or link to the source message).

As depicted, message display sub-interface 405 includes means for a user to submit feedback on an individual message (e.g., buttons 407c, 409c, and 411c). In one embodiment, the means are implemented as buttons on the interface configured to receive user actuation representing user feedback. The user feedback submitted may, in some embodiments, depend largely on which portion of the interface (e.g., which buttons) are actuated by the user. As presented, each pair of buttons 407c, 409c, and 411c include a positive "+" and negative "−" button. Thus, a viewer who receives (e.g., views) the contents of the message may indicate a particular message's subjective quality by selecting (e.g., actuating) either of the pair of buttons. In some embodiments, feedback may be limited to registered members of the community (e.g., users of the social network application). In still further embodiments, feedback may be limited to the original creator of the thread.

Message input sub-interface 413 enables a user to compose a new message to add to the thread. As depicted, message input sub-interface 413 includes a title 415a, a content panel 415b, an attachment mechanism 417a, 417b, 417c, a reference panel 419a, 419b, mechanisms for submitting the message 421 and a mechanism for canceling the yet un-submitted message 423. In one embodiment, title 415a may describe and/or identify the purpose of the sub-interface 413. Content panel 415b may be an input terminal configured to receive user input (e.g., via a keyboard or other input device) as text comprising the text of a message.

In further embodiments, users may be able to attach electronic files and/or post links to webpages via one or more attachment mechanisms. As depicted, an attachment mechanism may consist of a file target field 417a, a link target field 417c and an attachment mechanism 417b. The file target field 417a enables the user to identify the target file to attach to the message. Likewise, the link target field 417c enables the user to provide a direct link, e.g., as a url (Uniform Resource Locator) or "web address" to a webpage on a local Intranet or available on the Internet. When a link is provided, the link may be prominently displayed with the posted message. In other embodiments, the link may be appended with the text of the message but distinctly delineated (e.g., underlined). As depicted, attachment mechanism 417b may be implemented as a button on the sub-interface 413. After a file has been identified and/or a url link has been provided by the user in target field 417a, a user may begin the attachment process (e.g., upload) via actuation of attachment mechanism 417b.

Once a message is composed, a user may submit the message to the system via a mechanism for message submission. As depicted in FIG. 4, interface 400 includes a button 421 which allows the user to submit a message, including any attached files and/or url links the user may have specified in field 417a and 417c, respectively. Alternatively, if the user opts to discard the message in a present state, a user can utilize a mechanism (e.g., button 423) to cancel the yet un-submitted message. As depicted, button 423 is configured to receive as user input an actuation. Once an actuation is detected, the message may be discarded. In further embodiments, actuation of the button 423 may generate an additional verification window (not shown) to prevent accidentally discarded messages.

In still further embodiments, thread interface 400 may include a reference panel that provides a list of identified references. The references may comprise, for example, a list of other members of the social network community with an established affiliation with one or more of the disciplines corresponding to the subject and/or content of the thread displayed in thread interface 400. The reference panel may comprise a title 419a identifying the panel as well as a reference display 419b displaying the list of identified references. In one embodiment, the reference display 419b may include the names or user account names of the identified references.

In further embodiments, the reference display 419b may include a graphical representation of one or more of the identified references, such as a photograph of the user. The graphical representation may also present, for example, a miniaturized version of the visual representation displayed on the reference user's profile. In other embodiments, the visual representation may comprise an image or icon pre-selected by the reference user from an established base of icons. In still further embodiments, a graphical representation may also comprise a hyperlink, which, when actuated by the user, generates a separate interface (e.g., in a new window) or directs the interface to a separate interface for interacting and/or contacting the user account of the reference.

In still further embodiments, the references may be displayed in a pre-defined order. For example, the display may prioritize members by statistical achievement with respect to contributions made by the reference in the particular area or discipline. Alternatively, the display may limit and/or prioritize the references to the viewing user's private sub-network. In some embodiments, the display of references may be dynamically modified, depending on the content of the message in the message input sub-interface 413, or, alternatively, with the messages displayed in the message display sub-interface 405. Thus, a user is able to view suggested experts while drafting or revising a message, thereby allowing the user to specifically target the one or more suggested experts and ask for a contribution (e.g., a response).

According to some embodiments, users of the system may also be able to create additional threads within the discussion forum. A user may create additional threads via a separate thread creation interface (e.g., thread creation interface 600 described below), for example. According to these embodiments, the thread creation interface may be generated by user actuation on a corresponding mechanism (not shown) for thread creation. This mechanism may, in some embodiments, comprise a button on the interface 400. In other embodiments, this mechanism may comprise a button on the discussion forum interface described above with reference to FIG. 1.

Reply Window

Figure 5:
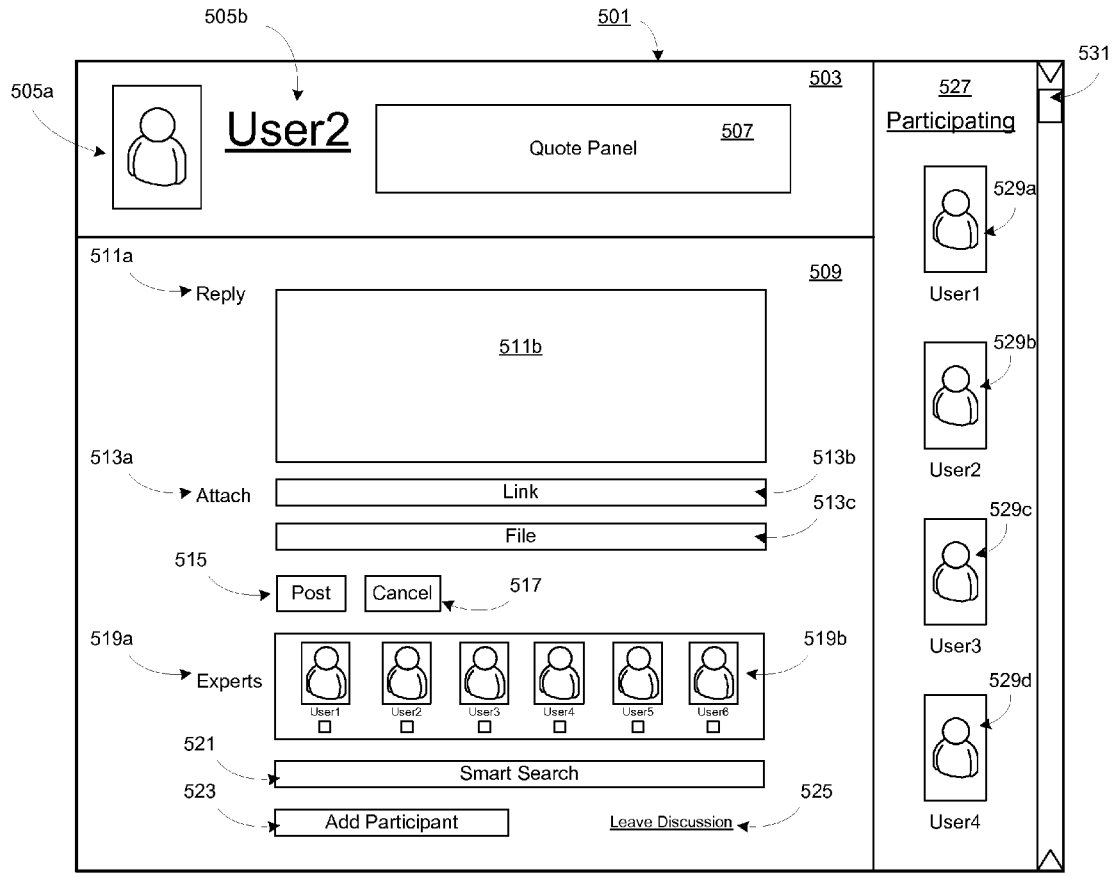
FIG. 5 is a depiction of an exemplary graphical reply window in a discussion thread of a discussion forum, in accordance with embodiments of the present invention.

With reference now to FIG. 5, a graphical depiction of an exemplary reply interface 500 in a discussion thread is depicted, in accordance with embodiments of the present invention. According to one embodiment, reply interface 500 may be implemented as a reply window 501, such as the window generated by user actuation on a reply button, such as reply buttons 407d, 409d, and 411d. In some embodiments, interface 500 may be provided on the same interface as the thread interface 401, such that the functionality and features provided in the reply interface 501 may be included in the thread interface 401. In alternate embodiments interface 500 is presented in a separate interface. In a typical configuration, interface 500 includes a message reference 503, a content portion 509 and a list of contributors (e.g., Participant List 527).

In one embodiment, message reference 503 displays a reference to the message in a thread being replied to. Message reference 503 may include, for example, a quote panel 507 displaying the text of the referenced message, the name of the author or user account authoring the reference message 505b, and a visual representation (e.g., icon 505a) of the author of the reference message.

Content portion 509 provides an interface for a responding user to interact with a referenced message. As depicted, content portion 509 includes a Text Field 511b, identified by title 511a, for receiving user submitted text as input. Text field 511b thus allows the entry of the text content of the reply message. In a typical configuration, a user responding to a referenced message may seek to introduce additional reference or explanatory material for subsequent viewers. This additional reference or explanatory material can comprise, for example, an online resource or a locally stored (or remotely accessible) file. For example, a user responding to a reference message that is a question may answer the question by posting a message through the text field 511b, post a web address or hyperlink to another online resource, or attach a local computer file which may explain or answer the question.

As depicted, interface 500 provides a link field (e.g., link field 513b), a target file field (e.g., file field 513c) and title 513a for identifying the purpose of the fields. Thus, a user may attach a local computer file through the file field 513c and submit a web address through the link field 513b. Once the reply message has been submitted, these additional references may be displayed in place of or along with the text of the message entered in the text field 511b.

Once a message is composed (and references attached), a user may submit the reply message to the system via a mechanism for message submission. Interface 500 includes a button 515 which allows the user to post (e.g., submit) a message, including any attached files and web addresses the user may have specified in any input fields. Alternatively, if the user opts to discard the message in its present state, a user can utilize a mechanism (e.g., button 517) to cancel the yet un-submitted message. As depicted, button 517 is configured to receive as user input an actuation. Once an actuation is detected, the message may be discarded. In further embodiments, actuation of the button 517 may generate an additional verification window (not shown) to prevent accidentally discarded messages.

In some embodiments, the content portion 509 also includes an expert request portion, wherein members of the social network which have been identified as experts, or having an established affiliation with a subject that corresponds to the one or more subjects the reference message is associated with, may be listed as possible candidates to reference. As depicted, the expert request portion includes an identifying title (e.g., title 519a), and a list 519b of identified experts for reference.

As shown, the list 519b of identified experts is implemented to display a visual representation of the expert. In further embodiments, the user authoring the reply message may generate a private message to a selected number of the identified experts by a user actuation (e.g., checking the box in the graphical portion of the list 519b). According to these embodiments, a sub-interface or new window may be generated by the user actuation to allow the user to generate the private message. In further embodiments, the message is not posted to the thread.

In still further embodiments, a user may be able to search for and/or specify additional references via a mechanism for focusing the identification of references to one or more keywords or names. As depicted, a button (e.g., smart search button 521) is provided in interface 501 which, when actuated by the user, may search the community and present a list of one or more suggested users corresponding to the searched-for terms. The list of suggested users may be determined based on projected adequacy in answering a question or providing a solution to a problem. Adequacy may be projected from, for example, a user's contributions and/or expertise in the area or a related discipline, a user's responsiveness to other targeted queries, etc. The list of users corresponding to the searched-for terms may be presented in, for example, a separate window or interface dynamically generated in response to user actuation of the smart search button 521. The message's author may select from the suggested users and include the selections as recipients of a separate message and/or a notification notifying the recipients of the message, when the message is posted.

In one embodiment, the returned list of suggested users corresponding to the searched-for terms may be limited to the private network of the user. In alternate embodiments, actuation of the smart search button 521 provides a list of users which may include members outside the user's private network. According to these embodiments, the members within the user's private network may be prioritized or otherwise distinguished from other users. In some embodiments, if a keyword relating to an affiliation is searched for, the returned list of users corresponding to the searched-for terms may include users identified as experts in disciplines corresponding to the searched-for keyword(s). In other embodiments, the experts may be limited to the searching user's private network, and/or prioritized over other experts outside the searching user's private network.

In some embodiments, the user is also able to target an individual and provide a reference to the thread or message. In one embodiment, this ability is provided through a button (e.g., add participant button 523) on the interface 501, which, when actuated by the user, enables the user to provide an identification of another member of the social network. In further embodiments, actuating the add participant button 523 creates an additional input field or window which allows the user to specifically identify another member (e.g., by supplying the member's user account name, e-mail address, etc.)

Once another user has been identified, a notification may be delivered to the user that includes a hyperlink to the web address of the thread interface 500 displayed in the window 501. This notification may be delivered as an e-mail to the user's account or other e-mail address. Alternatively, the notification may also appear as a notice on the user's profile (e.g., within the user's tab 209a and user activity panel 313 as described above with reference to FIGS. 2 and 3, respectively). The notification may, in some embodiments, include an invitation for the recipient to join (e.g., subscribe and/or contribute to) the thread. A user accepting the invitation may henceforth contribute to the discussion by posting messages, files, and/or links to the thread display interface. Alternately, users who happen to view a public thread may contribute to the thread simply by replying to a message and submitting a response (e.g., text, file(s), and/or link(s)).

When a thread is a private thread (as specified by the thread creator), only users that have been invited to contribute the thread, either by the thread creator or subsequent permitted (e.g., invited) contributors are able to view, search for, and contribute to the thread. In further embodiments, an invited contributor may, in turn, invite new contributors. Accordingly, the local expert network for a particular thread, both private and public, may be continuously expanded, thereby increasing the aggregate pool of knowledge while retaining the focus, responsiveness, intimacy, and privacy of a targeted e-mail exchange.

According to some embodiments, once a user has contributed to a thread, the user may be automatically added to a list of participants to the discussion. Once added, the user may be notified (e.g., via e-mail, or through the user's profile) whenever activity in the thread is registered (e.g., messages are added). In one embodiment, notifications to the user may be displayed in the Requests Display Area 203b, as described above with reference to FIG. 2. In some embodiments, the user may also be able to enlist as a participant without posting a message.

According to these embodiments, a user may also choose to be removed from the list of participants, so as to avoid receiving notifications. As depicted, interface 501 includes a mechanism (e.g., Leave Discussion button 525) that allows the user to remove the user's account from the list of participants. Leave Discussion button 525 is implemented as a button, which, when actuated, unsubscribes the user from the thread, thus preventing the user from being subsequently notified whenever activity in the thread is registered.

As depicted, interface 501 also includes a list of contributors (e.g., Participant List 527) displaying a list of the current members of the community participating in the discussion. In one embodiment, the list of participating members comprises the members who have contributed (e.g., posted messages) in the thread and/or receive notifications for thread activity. The list of participating members may be displayed as list of icons (e.g., 529a, 529b, 529c, and 529d) which visually represent the user account of the participating member. In further embodiments, a scroll bar 531 is provided to traverse a single display containing representations of some or all of the participating members. In some embodiments, the list of participating members may be displayed according to a particular order, and may be ordered differently for each viewer. For example, the list of participating members may be ordered according to the number of activity (e.g., contributions) within the particular thread. Other orders may include, but are not limited to, ordering the list according to activity across all threads (e.g., the number of total contributions), and ordering the list according to expertise statistics, or other expertise metrics, etc.

Thread Creation Interface

Figure 6:
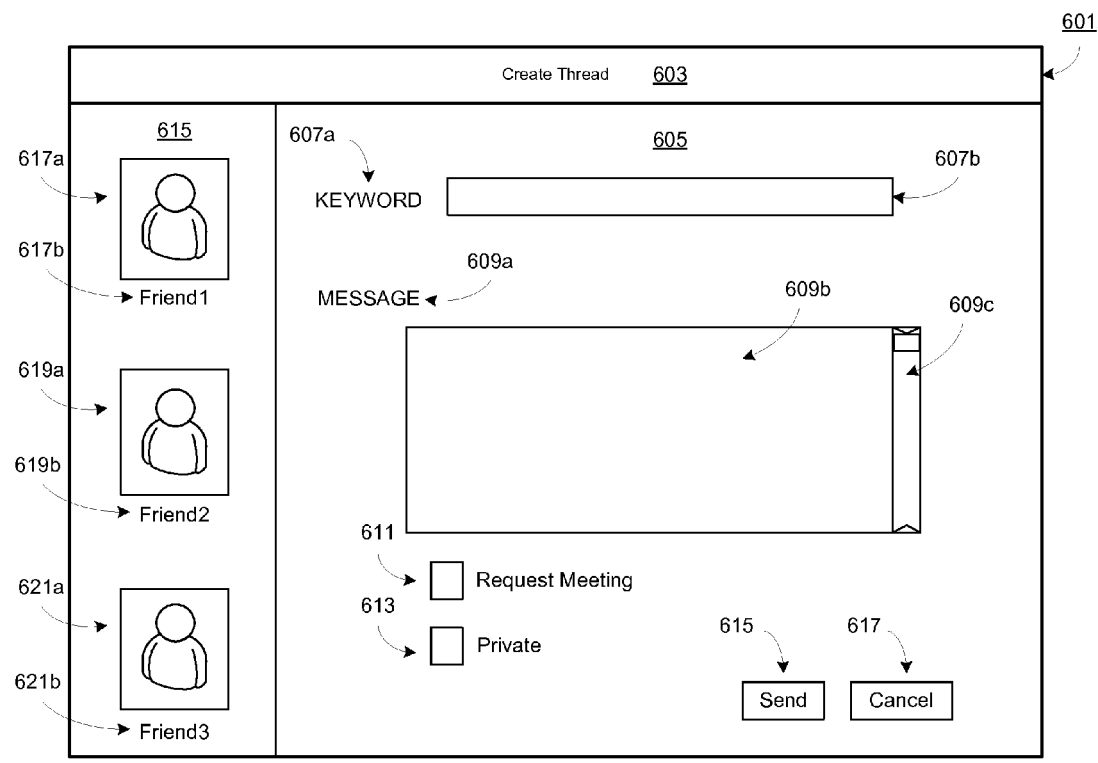
FIG. 6 is a depiction of an exemplary thread creation interface, in accordance with embodiments of the present invention.

With reference now to FIG. 6, a graphical depiction of an exemplary thread creation interface 600 is depicted, in accordance with embodiments of the present invention. The thread creation interface allows a user to create a targeted or untargeted thread for a given topic of discussion through the submission of a thread initiating message. A thread is subsequently created from (and including) the thread initiating message, wherein viewing users may be able to contribute to the thread (e.g., reply to the thread initiating message and subsequent messages comprising the thread).

A thread initiating message may include one or more targets and include text, files and/or links comprising the contents of a message. For targeted threads, a separate and specific notification may be sent to the identified targets. These targets may comprise expert references, such as the references identified in a social networking application. According to one embodiment, thread creation interface 600 may be implemented as a thread creation window 601, such as the window generated by user actuation on an button or mechanism to create a new thread. In a typical configuration, window 601 includes a header portion 603, a content portion 605 and a recipient list 615.

As depicted, header 603 identifies the window 601. Content portion 605 comprises a subject line (collectively, 607a, 607b), a message sub-component (collectively, 609a, 609b, 609c), and message submission and message cancellation buttons (615 and 617, respectively). The subject line 607a, 607b allows the composing user to particularly identify the subject, context or realm of the user's query or message. For example, the subject could be a class or discipline that is affiliated with one or more of the experts displayed in recipient list 615. In one embodiment, the subject line corresponds to the subject of the thread and/or specific message. The subject line includes a title (e.g., "keyword" title 607a) identifying the subject line and the actual terms and/or phrases which represent the subject in subject field 607b. In other embodiments, the subject line entails the title for the entire thread.

The message sub-component of window 601 includes an identifier 609a, the text field 609b and a means for navigating the text field 609c. As depicted, the identifier 609a identifies the message sub-component. The text field 609b is implemented as an input terminal for receiving user input as text that comprises the message or communication that will be delivered to the identified recipients. Message submission button 615 allows the user to submit the message as presently constructed via user actuation on the button 615. Meanwhile, message cancellation button 617 allows the user to cancel the message and close the window without delivering the message to any recipients via user actuation of the button 617.

According to further embodiments, the user composing the thread creation message may be able to request a meeting (e.g., in a social networking application for a single enterprise) with one or more experts via a mechanism on the interface 600 (e.g., meeting toggle 611). In still further embodiments, the user is able to submit the message (e.g., create the thread) privately for specifically invited members via a separate mechanism on the interface 600 (e.g., private toggle 613). In one embodiment, submitting the message as a private message prevents the message from being posted (e.g., visible) publicly in the discussion forum interface, thereby allowing only the specifically invited members the ability to view, search for, and respond to the message and/or thread. In some embodiments, posting the thread or message privately may also prevent the discovery of the thread and/or constituent message from searches conducted by untargeted members of corresponding subjects (e.g., via searching mechanism 121 and 123 described above with reference to FIG. 1). Conversely, a private thread is visible and available in the discussion forum interface to the invited members. In further embodiments, submitting the message as a private message sends the notification as an electronic-message to the recipients' personal accounts and is not displayed in a publicly visible display (e.g., on a recipient's profile).

As presented, recipient list 615 presents a display of the identified users which have been specifically targeted by the message's author to invite to contribute to the thread. In one embodiment, recipient list may automatically include experts affiliated with the subject or selected by the message's author to receive the expert request message, along with the other specifically identified persons (which may or may not be acknowledged experts). In a further embodiment, the recipient list may be automatically populated with experts only when the user has not specifically targeted any other recipients, but has opted that the thread or message remain private. Thus, the user is granted the ability to discreetly submit questions to identified experts even if the user does not know any such experts personally.

In some embodiments, the recipient list 615 displays a visual representation, such as a portrait or icon (e.g., image 617a, 619a, 621a) along with the corresponding identification, such as the name of the member or the user account (e.g., 617b, 619b, 621b). In further embodiments, the system may dynamically add or remove experts to the recipient list based on the content of the message, even prior to the actual message posting. Thus, the recipient list may be altered even while the user is in the process of creating and/or refining the message. This feature allows the user the ability to identify potential resources dynamically and on an ad hoc basis, for each message or thread.

Accordingly, through the combination of a discussion forum interface with individual targeting functionality integrated within a social networking infrastructure, a viewer of a discussion thread is able to reference specific individuals to contribute to a broadly received discussion. Subsequently, users within the community may be able to search for similar keywords or themes. When subsequent users pose similar queries, the user may be able to search for, and locate the thread for reference. Alternatively, for non-identical but related queries, the user is able to easily identify experts within the subject based on contributions and or acknowledgements stemming from the prior thread.

Thus, the ability to query potentially qualified references for assistance may be advantageously granted whilst retaining the benefits of accessibility, persistence, and reusability characteristic of a modern discussion forum. In particular, the advanced capabilities of sophisticated social networking applications allows the identification of qualified references, creates incentives to contribute, and allows the expansion of a broader personal network, all of which provide an improved user experience.

Although the subject matter has been described in language specific to structural features and/or processological acts, it is to be understood that the subject matter defined in the appended claims is not necessarily limited to the specific features or acts described above. Rather, the specific features and acts described above are disclosed as example forms of implementing the claims.

What is claimed is:

1. An electronic system for referring targeted individuals to a discussion forum, the electronic system comprised in an integrated application implemented as computer-readable instructions executable by a processor in a computing device, and comprising:

a first graphical user interface displaying the discussion forum, the discussion forum arranged as a plurality of discussion topics respectively coupled to a plurality of displays of respective user-generated contents corresponding to the plurality of discussion topics;

a second graphical user interface navigable from the first graphical user interface and displaying a user-generated content of the respective user-generated contents corresponding to a discussion topic of the plurality of discussion topics, the second graphical user interface comprising:

a display of the user-generated content comprising a plurality of messages respectively received from a plurality of contributing users and identifications of the plurality of contributing users, a user input terminal for receiving a first user input to append a message to the plurality of messages in the display of the user-generated content, an address input terminal for receiving a second user input identifying one or more targeted individuals, and a feedback tool comprising a positive selector and a negative selector, wherein the integrated application is configured to perform operations comprising:

automatically associating each of the plurality of messages with one or more pre-defined classes based on an association of the one or more pre-defined classes with the discussion topic, receiving one or more feedbacks respectively from one or more viewing users of the electronic system via the positive selector and the negative selector of the feedback tool, the one or more feedbacks respectively comprising subjective characterizations of one or more of the plurality of messages, tracking the one or more feedbacks in association with one or more contributing users of the plurality of contributing users of the one or more of the plurality of messages according to numbers of messages respectively contributed to the discussion forum with respect to areas of expertise of the one or more contributing users, displaying the areas of expertise of the one or more contributing users in one or more user content panels associated with one or more respective user accounts of the one or more contributing users based on the one or more feedbacks that are tracked, and displaying one or more sets of statistics associated with the areas of expertise of the one or more contributing users in the one or more user content panels, the one or more sets of statistics based on the one or more feedbacks that are tracked, ratios based on the subjective characterizations of the one or more feedbacks, and total historical numbers of contributions provided to the discussion forum by the one or more contributing users.

2. The system according to claim 1, wherein the first graphical user interface is comprised on a website.

3. The system according to claim 2, wherein the website comprises a plurality of web pages corresponding to the plurality of discussion topics, and further wherein a web page of the plurality of web pages corresponds to the second interface.

4. The system according to claim 3, wherein a notification is delivered to the plurality of targeted individuals, and wherein the notification comprises a link to the second graphical user interface.

5. The system according to claim 4, wherein the link comprises a hyperlink to the web page of the second interface.

6. The system according to claim 1, wherein the notification is sent via email.

7. The system according to claim 1, wherein the address input terminal is configured to receive as user input a plurality of email-addresses corresponding to the plurality of targeted individuals.

8. An electronic system for referring targeted individuals to a discussion forum in a social network interface, the electronic system comprised in an integrated social network application implemented as computer-readable instructions executed by a processor in a computing system, the social network interface comprising:
- a plurality of user accounts respectively corresponding to members of a social network;
- a discussion forum comprising a discussion forum interface displaying a plurality of topics; and
- a plurality of discussion threads respectively corresponding to the plurality of topics and comprising a plurality of discussion thread interfaces coupled to the discussion forum interface, each discussion thread interface of the plurality of discussion thread interfaces comprising:
  - a thread display for displaying a plurality of forum messages respectively corresponding to a discussion thread of the plurality of discussion threads and identifying user accounts of the plurality of user accounts respectively corresponding to the plurality of forum messages, the plurality of forum messages respectively comprising user-generated contents;
  - a first graphical user interface for receiving a user input to create a forum message, the forum message being appended to the plurality of forum messages in the thread display, and
  - a second graphical user interface for targeting one or more identified members of the social network, and
  - a feedback tool comprising a positive selector and a negative selector,
wherein the integrated social network application is configured to perform operations comprising:
- automatically associating each of the plurality of forum messages with one or more pre-defined classes based on an association of the one or more pre-defined classes with the discussion thread,
- receiving one or more feedbacks respectively from one or more viewing users of the plurality of forum messages via the positive selector and the negative selector of the feedback tool, the one or more feedbacks respectively corresponding to one or more of the plurality of messages and comprising subjective characterizations of the one or more of the plurality of forum messages,
- tracking the one or more feedbacks respectively in association with one or more of the plurality of user accounts according to numbers of forum messages respectively contributed to the discussion form with respect to areas of expertise associated with the one or more of the plurality of user accounts,
- displaying the areas of expertise in one or more user content panels associated with the one or more of the plurality of user accounts based on the one or more feedbacks that are tracked, and
- displaying one or more sets of statistics associated with the areas of expertise of the one or more of the plurality of user accounts in the one or more user content panels, the one or more sets of statistics based on the one or more feedbacks that are tracked, ratios based on the subjective characterizations of the one or more feedbacks, and total historical numbers of contributions provided to the discussion forum by one or more members of the social network associated with the one or more of the plurality of user accounts.

9. The system of claim 8, the system further comprising:
- a plurality of electronic message interfaces corresponding to the plurality of user accounts.

10. The system of claim 9, wherein a notification is delivered to the plurality of user accounts corresponding to the plurality of identified members of the social network and wherein the notification is delivered to the plurality of electronic message interfaces corresponding to the plurality of user accounts corresponding to the plurality of identified members of the social network.

11. The system of claim 8, wherein a forum message comprises a hyperlink to a web page.

12. The system of claim 8, wherein a forum message comprises an electronic file accessible by members of the social network.

13. The system of claim 12, wherein only authorized members of the social network are allowed to access the electronic file.

14. The system of claim 8, wherein the discussion forum interface further comprises a third graphical user interface configured to receive user input corresponding to a new discussion topic, and further wherein a discussion thread is added to the plurality of discussion threads comprised in the discussion forum to correspond to the new discussion topic.

15. The system of claim 8, wherein a member of the social network is associated within the social network with an area of expertise.

16. The system of claim 15, wherein a notification is automatically sent to a member associated with a first area of expertise when a discussion thread corresponding to the first area of expertise is added to the plurality of discussion threads comprised in the discussion forum.

17. The system of claim 15, wherein a notification is automatically sent to a member associated with a first area of expertise when a forum message corresponding to the first area of expertise is appended to a thread.

18. The system of claim 8, further comprising:
- a plurality of sub-networks corresponding to the plurality of user accounts, wherein a sub-network corresponds to a specific user account of the plurality of user accounts and comprises the specific user account and a collection of other user accounts in the social network.

19. The system of claim 18, wherein a first user account of the plurality of user accounts is capable of defining the collection of other user accounts comprised in the sub-network corresponding to the first user account.

20. The system of claim 19, wherein a notification is automatically delivered to the collection of other user accounts in the first sub-network corresponding to the first user account whenever a forum message comprised of input from the first user account is created.

21. The system of claim 19, wherein a notification is automatically delivered to a plurality of specific user accounts in the first sub-network defined by the first user account whenever a forum message comprised of input from the first user account is created.

22. The system of claim 21, wherein the plurality of specific user accounts in the first sub-network may be defined in the first user account dynamically whenever a forum message comprised of input from the first user account is created.

23. The system of claim 19, wherein a notification is automatically delivered to a designated plurality of user accounts in the first sub-network, the designated plurality of user accounts being associated with an area of expertise.

24. A method of referring specific users to discussion threads in an integrated application, the method comprising:
    detecting a user-generated actuation on a first graphical user interface comprising a discussion thread of a discussion forum, the discussion thread comprising a plurality of messages and identifying a plurality of contributing users corresponding to the plurality of messages;
    generating an e-mail interface in response to the user-generated actuation;
    receiving as a user-input an e-mail address in the e-mail interface; and
    sending a reference to the first graphical user interface to the e-mail address;
    automatically associating each of the plurality of messages with one or more pre-defined classes based on an association of the one or more pre-defined classes with the discussion thread;
    receiving one or more user feedbacks respectively from one or more viewing users of one or more of the plurality of messages via a positive selector and a negative selector of a feedback tool, the one or more user feedbacks respectively corresponding to the one or more of the plurality of messages and comprising subjective characterizations of the one or more of the plurality of messages,
    tracking the one or more user feedbacks in association with one or more contributing users of the plurality of contributing users of the plurality of messages to numbers of messages respectively contributed to the discussion form with respect to areas of expertise of the one or more contributing users,
    displaying the areas of expertise of the one or more contributing users in one or more user content panels associated with one or more respective user accounts of the one or more contributing users based on the one or more feedbacks that are tracked, and
    displaying one or more sets of statistics associated with the areas of expertise of the one or more contributing users in the one or more user content panels, the one or more sets of statistics based on the one or more feedbacks that are tracked, ratios based on the subjective characterizations of the one or more feedbacks, and total historical numbers of contributions provided to the discussion forum by the one or more contributing users.

25. The method of claim 24, wherein the discussion forum is hosted on a website.

26. The method of claim 25, wherein the first graphical user interface comprises a first webpage comprised in the website.

27. The method of claim 26, wherein the reference comprises a hyperlink to the first webpage.

28. The method according to claim 24, wherein the integrated application comprises a social network application.

29. The method according to claim 28, the method further comprising:
    automatically sending a reference to a plurality of pre-designated users of the social network application.

30. The method according to claim 29, wherein the pre-designated users comprise users of the social network application associated with at least one of: a keyword in a title corresponding to the discussion thread; and a plurality of keywords comprised in a forum message corresponding to the discussion thread.

31. The electronic system according to claim 1, wherein the one or more sets of statistics provide one or more representative histories of the one or more contributing users.

32. The electronic system according to claim 1, wherein the one or more viewing users have one or more affiliations with the one or more pre-defined classes.

33. The electronic system according to claim 32, wherein the one or more affiliations are associated with interests of the viewing users.

34. The electronic system according to claim 32, wherein the one or more affiliations are associated with expertise of the viewing users.

35. The electronic system of claim 32, wherein the one or more affiliations are established by self-election of the one or more viewing users.

36. The electronic system of claim 32, wherein the one or more affiliations are established by peer nominations.

37. The electronic system of claim 32, wherein the one or more affiliations are established based on historical contributions of the one or more viewing users.

* * * * *